(12) United States Patent
Ross et al.

(10) Patent No.: US 8,805,014 B2
(45) Date of Patent: Aug. 12, 2014

(54) PRODUCE COLOR DATA CORRECTION METHOD AND AN APPARATUS THEREFOR

(75) Inventors: Gary Ross, Edinburgh (GB); Meng Yu, Dundee (GB)

(73) Assignee: NCR Corporation, Duluth, GA (US)

(*) Notice: Subject to any disclaimer, the term of this patent is extended or adjusted under 35 U.S.C. 154(b) by 209 days.

(21) Appl. No.: 13/546,269

(22) Filed: Jul. 11, 2012

(65) Prior Publication Data

US 2014/0016818 A1 Jan. 16, 2014

(51) Int. Cl.
*G06K 9/00* (2006.01)
*G06K 9/62* (2006.01)

(52) U.S. Cl.
CPC .................................. *G06K 9/62* (2013.01)
USPC ....................................................... 382/103

(58) Field of Classification Search
None
See application file for complete search history.

(56) References Cited

U.S. PATENT DOCUMENTS 6,069,696 A * 5/2000 McQueen et al. ............. 356/326
6,296,186 B1 * 10/2001 Spencer et al. .......... 235/462.01

* cited by examiner

*Primary Examiner* — Amara Abdi
(74) *Attorney, Agent, or Firm* — Harden E. Stevens, III

(57) ABSTRACT

A produce recognition system comprises an image capture device arranged to (i) capture a first color image which is representative of a color image of a produce item, and (ii) capture a second color image which is representative of a color image of at least one target color swatch. The produce recognition system further comprises control circuitry arranged to (i) calculate one or more color correction factors based upon differences between the captured second color image and a store of reference color images, and (ii) apply the calculated one or more color correction factors to the captured first color image to correct for color variations in the color image of the produce item due to a combination of variations in natural lighting and variations in interior lighting.

18 Claims, 4 Drawing Sheets

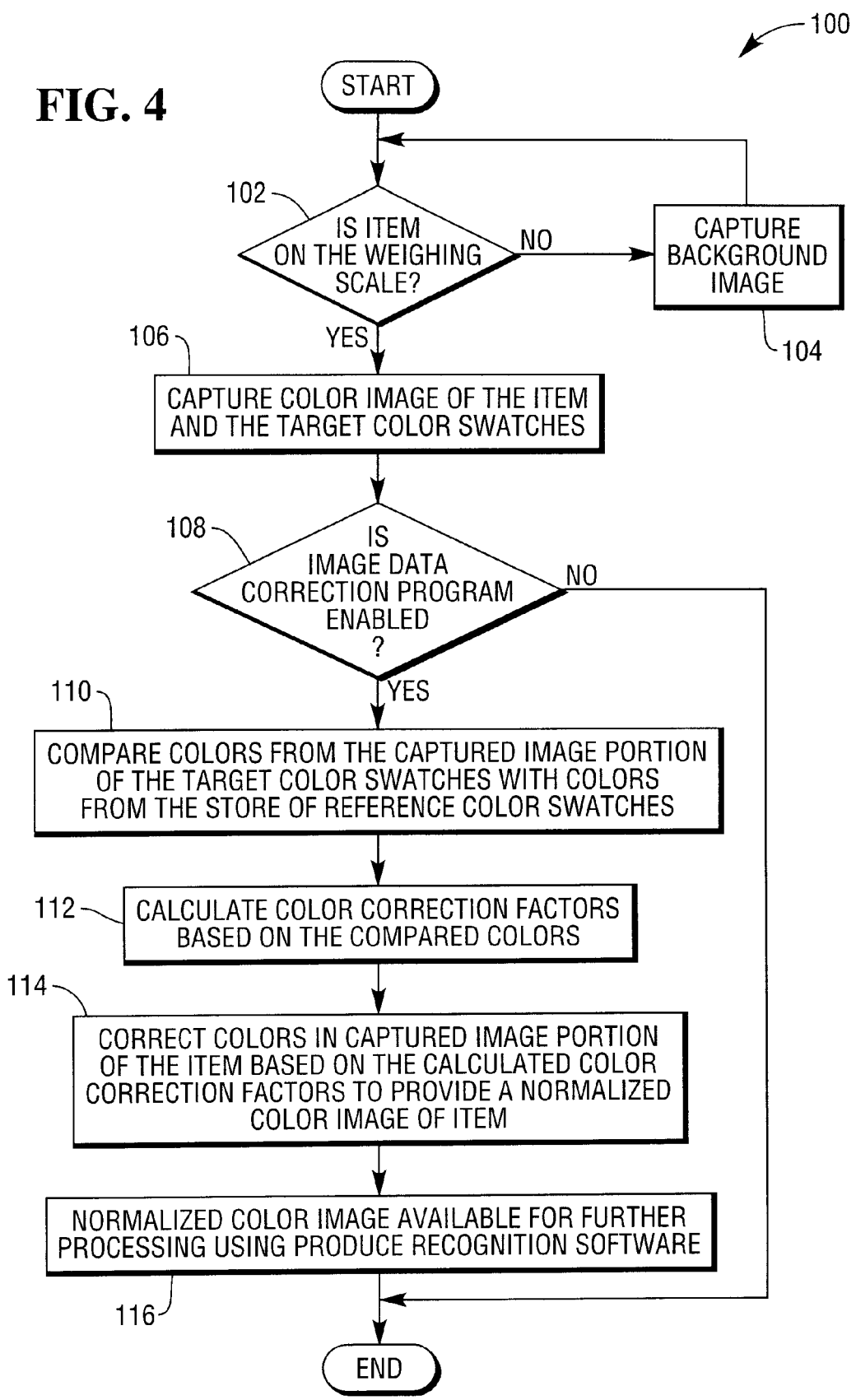

PRODUCE COLOR DATA CORRECTION METHOD AND AN APPARATUS THEREFOR

BACKGROUND

The present application relates to produce recognition systems, and is particularly directed to a produce color data correction method and an apparatus therefore. The method and apparatus may be embodied in a produce recognition system in a retail checkout environment.

Automated or operator-assisted identification methods for identifying produce items are known. The known methods may use color as the main factor in identifying a produce item. An imaging camera may be used to capture produce color data associated with a produce item placed on a produce weighing scale. The captured produce color data is then processed to either identify the produce item or to display a list and/or stored images of produce items on the list for verification by an operator.

A drawback in using color as a factor in identifying a produce item is that measured color of the produce item varies with changes in illumination color which, in turn, varies with changes in natural light, changes in interior light, and the balance between natural light and interior light. Sunlight, clouds, window effects, and reflections, for examples, may cause changes in natural light. Type of light source, age of the light source, cycle phase (if alternating current) of the light source, and reflections, for examples, may cause changes in interior light. It would be desirable to correct variations in measured color of a produce item due to either variations in natural light or variations in interior light.

SUMMARY

In accordance with one embodiment, a produce recognition system comprises an image capture device arranged to (i) capture a first color image which is representative of a color image of a produce item, and (ii) capture a second color image which is representative of a color image of at least one target color swatch. The produce recognition system further comprises control circuitry arranged to (i) calculate one or more color correction factors based upon differences between the captured second color image and a store of reference color images, and (ii) apply the calculated one or more color correction factors to the captured first color image to correct for color variations in the color image of the produce item due to a combination of variations in natural lighting and variations in interior lighting.

BRIEF DESCRIPTION OF THE DRAWINGS

FIG. 4 is a flow diagram which depicts operation of a method in accordance with one embodiment to correct for color variations in the produce color data collector of FIGS. 1, 2, and 3.

DETAILED DESCRIPTION

Figure 1:
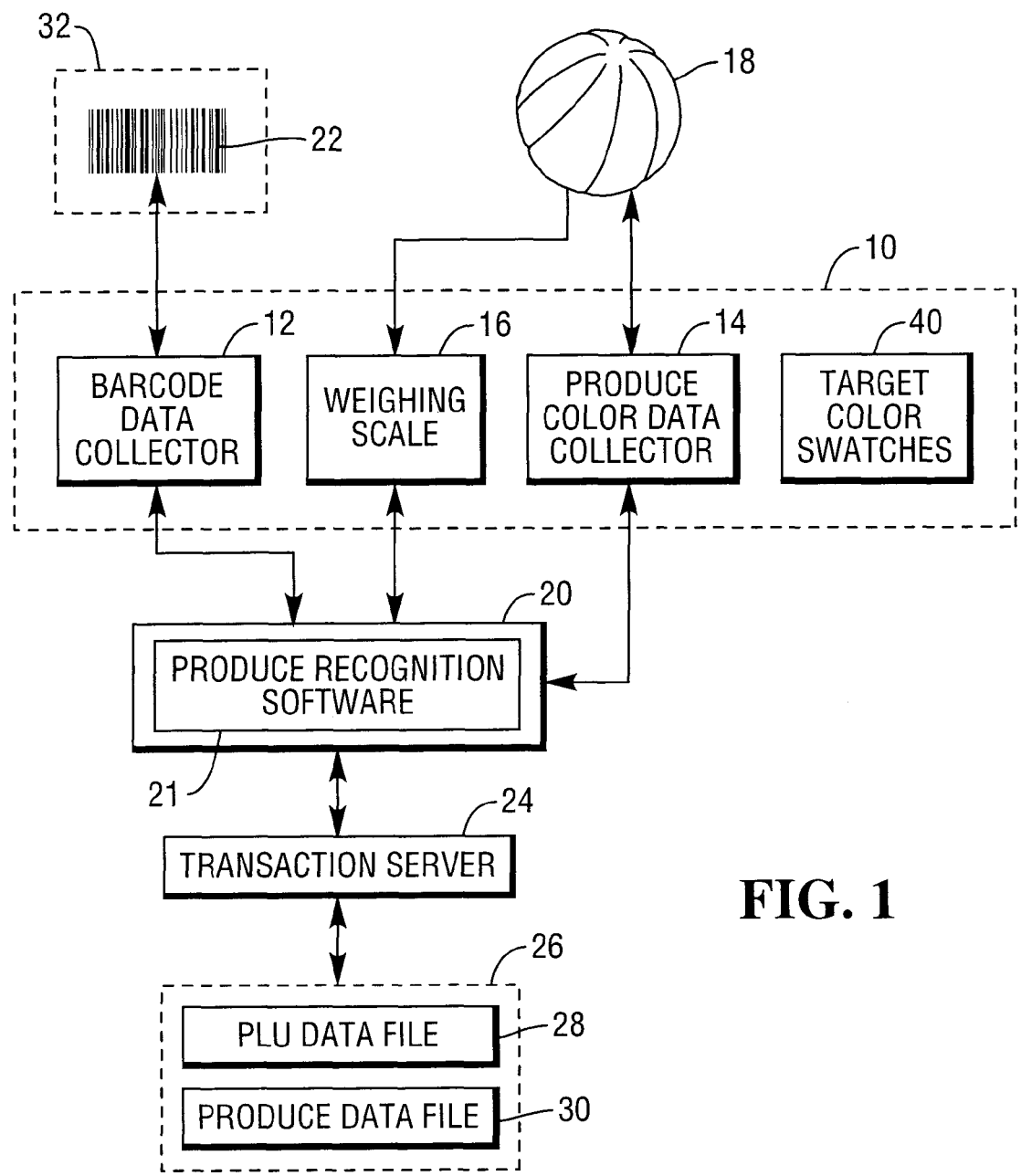
FIG. 1 is a block diagram of a transaction processing system including an item checkout device containing a produce color data collector constructed in accordance with one embodiment.

Referring to FIG. 1, item checkout device 10 includes barcode data collector 12, weighing scale 16, produce color data collector 14, and one or more target color swatches 40.

Barcode data collector 12 reads barcode 22 on merchandise item 32 to obtain an item identification number, also known as a price look-up (PLU) number, associated with item 32. Barcode data collector 12 may be any barcode data collector, including an optical barcode scanner which uses laser beams to read barcodes. Barcode data collector 12 may be located within a checkout counter or mounted on top of a checkout counter.

Scale 16 determines a weight for produce item 18. Scale 16 works in connection with barcode data collector 12 and produce color data collector 14, but may be designed to operate and be mounted separately. Weight information from scale 16 may be used to identify produce item 18.

Produce color data collector 14 collects color data associated with produce item 18 for the purpose of identifying produce item 18. Reference produce color data is collected and stored within produce data file 30. During a transaction, produce color data is collected and compared to produce color data within produce data file 30. Produce color data collector 14 may act as a primary means of identifying produce item 18. Produce color data collector 14 may be combined with barcode data collector 12 into an integrated unit.

Figure 2:
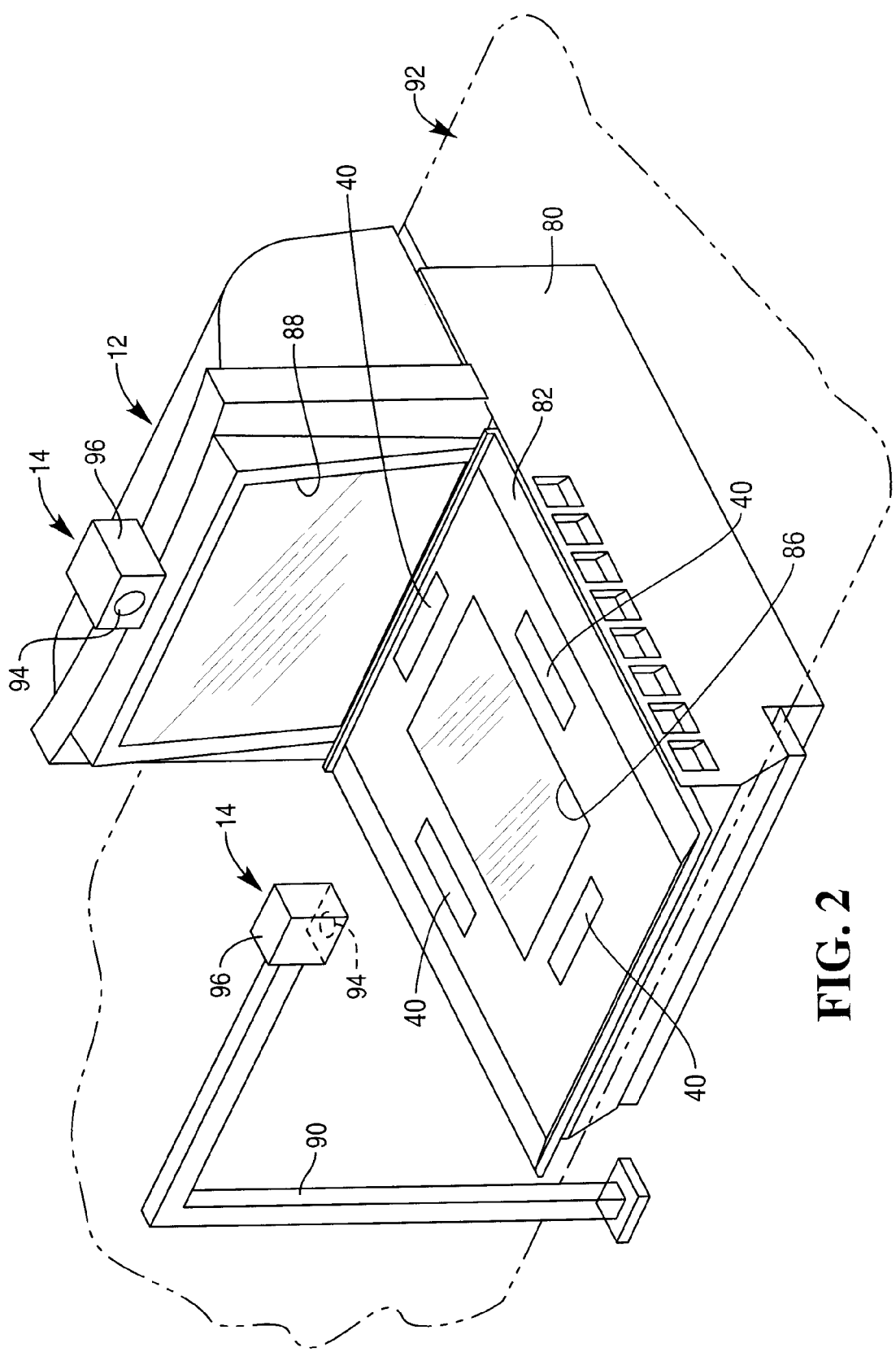
FIG. 2 is a perspective view of the item checkout device of FIG. 1, and showing the produce color data collector.

Referring to FIG. 2, example mounting arrangements are shown for produce color data collector 14. A first mounting arrangement for produce color data collector 14 is to mount its housing 96 within housing 80 of optical barcode scanner 12. Produce color data collector 14 is mounted outside the paths of light within the optical barcode scanner 12 to avoid interference with the operation of the optical barcode scanner 12. In this first arrangement, produce color data collector 14 is mounted above aperture 88 of the optical barcode scanner 12 so that aperture 94 of produce color data collector 14 faces diagonally downward toward aperture 86 of the optical barcode scanner 12.

A second mounting arrangement for produce color data collector 14 is to attach its housing 96 to a pole 90 mounted to checkout counter 92 so that aperture 94 of produce color data collector 14 faces downward. Other mounting arrangements for produce color data collector 14 are also possible. In each case, an operator initiates operation of produce color data collector 14 at transaction terminal 20 and places produce item 18 in field of view of aperture 94 of produce color data collector 14.

As best shown in FIG. 2, four target color swatches 40 are embedded on the top surface of weighing plate 82 of weighing scale 16 (FIG. 1). Each of the target color swatches 40 may comprise an array of 24 scientifically prepared natural, chromatic, primary, and grayscale color squares in a range of different colors. The array of 24 colored squares is sometimes referred to as a classic color checker. Color checkers are known and commercially available and, therefore, will not be further described. Although four target color swatches 40 are shown in FIG. 2, it is conceivable that any number of color swatches may be used. Also, any type of target color swatch with any number of different colors may be used.

Transaction terminal 20 controls operation of produce color data collector 14 to identify produce item 18 and thereby to allow an operator to complete a transaction with a customer. Alternatively, transaction server 24 may identify produce item in a network of transaction terminals 20. In either case, transaction server 24 obtains item identification information from produce data file 30 and sends corresponding unit price from PLU data file 28 to transaction terminal 20. PLU data file 28 and produce data file 30 are stored within storage medium 26, but either may also be located instead at transaction terminal 20.

More specifically, when produce item 18 is placed on scale 16, weight information for produce item 18 is sent from scale 16 to transaction terminal 20 so that transaction terminal 20 can determine a price for produce item 18 based upon the weight information. When produce item 18 is on scale 16, produce item 18 is in the field of view of aperture 94 of produce color data collector 14. Transaction terminal 20 executes known produce recognition software 21 which obtains image data containing color information from produce color data collector 14, and compares the color image data with reference produce color data in produce data file 30 to identify produce item 18.

After produce item 18 is identified, transaction terminal 20 obtains a unit price from PLU data file 28 for the identified produce item. Transaction terminal 20 then calculates a price for produce item 18 by multiplying the unit price by the weight of produce item obtained from scale 16. Transaction terminal 20 incorporates produce item 18 and its calculated price into a transaction record.

Figure 3:
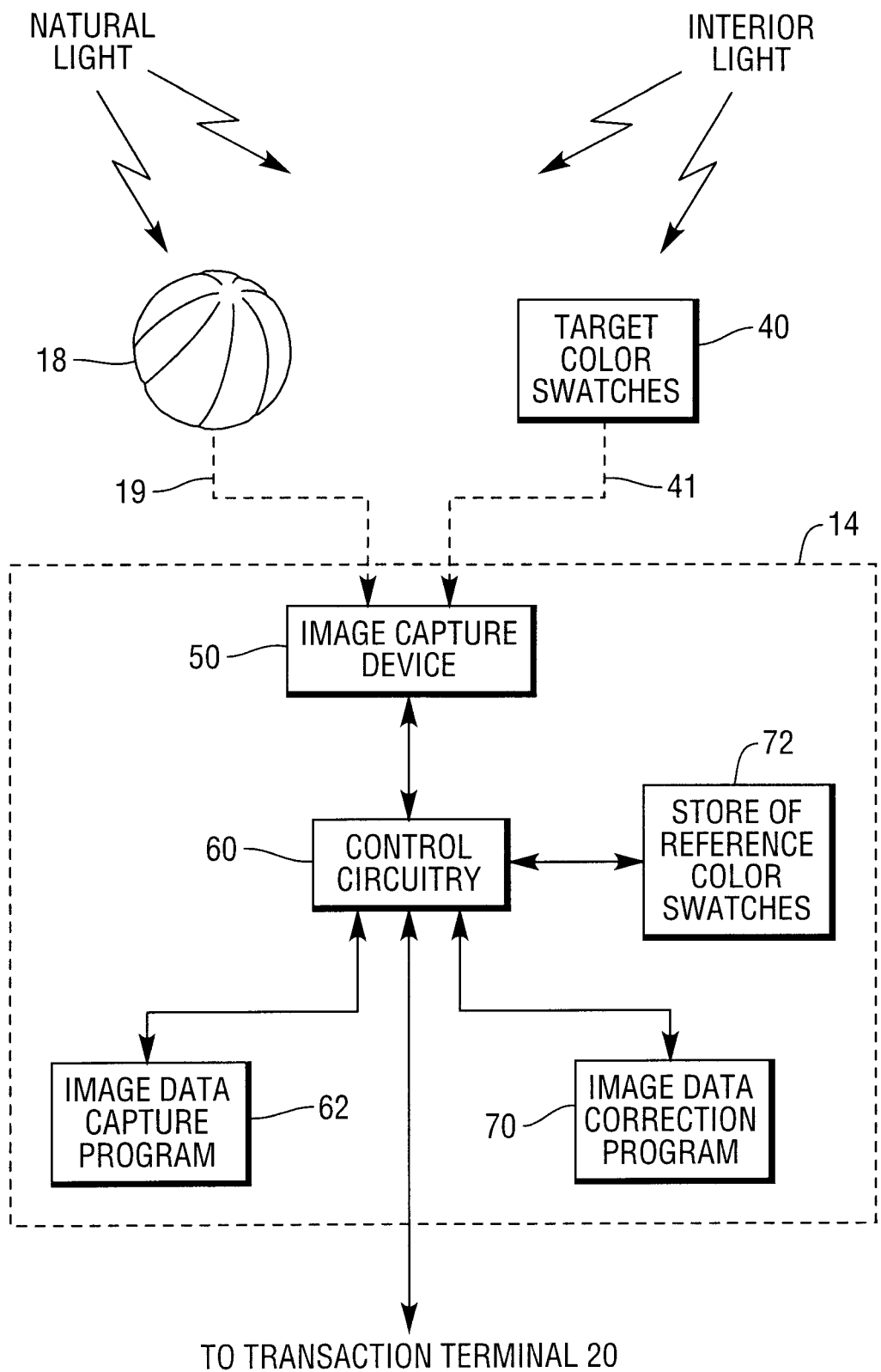
FIG. 3 is a block diagram of the produce color data collector shown in FIGS. 1 and 2.

Referring to FIG. 3, item checkout device 10 includes the one or more target color swatches 40, image capture device 50, control circuitry 60, image data capture program 62, image data correction program 70, and a store 72 of reference color swatches. The colored squares of the target color swatches 40 provide consistent color appearance under a variety of lighting conditions, as is known. Each of the one or more target color swatches 40 is in the field of view of the aperture 94 of the produce color data collector 14. The store 72 of reference color swatches is a store of color image data which is representative of at least one reference color swatch against which captured color image data which is representative of the target color swatches 40 is compared, as will be described in more detail hereinbelow.

Image capture device 50 may be a charge coupled device (CCD), for example. As another example, image capture device 50 may be a complementary metal oxide semiconductor (CMOS) camera. Other types of image capture devices are also possible. Each of the image data capture program 62, the image data correction program 70, and the store 72 of reference color swatches may be stored in separate storage memories or together in a single storage memory.

Control circuitry 60 controls image capture device 50 in accordance with executable instructions of image data capture program 62 to capture a color image of produce item 18 and a color image of the one or more target color swatches 40 illuminated by a combination of natural light and interior light. Natural light and interior light are shown as bolted arrows at the top of FIG. 3. The color image of the produce item 18 and the color image of the one or more target color swatches 40 may be captured at the same time. Control circuitry 60 may include any number of electronic processors or microcomputers, and memory as needed for operation of produce color data collector 14. Suitable electronic processors, microcomputers, and memories are known and commercially available and, therefore, will not be described.

When produce item 18 is placed on scale 16, image capture device 50 captures a color image of produce item 18 and the one or more target color swatches 40. Alternatively, image capture device 50 may capture a color image of produce item 18 and the one or more target color swatches 40 in response to operated-initiated commands from transaction terminal 20. In either case, control circuitry 60 processes the captured color image of the produce item 18 and the one or more color swatches 40 in accordance with executable instructions of image data correction program 70 to correct for variations in measured color of the produce item 18. The variations in measured color of the produce item 18 may be due to either variations in natural light or variations in interior light. Control circuitry 60 also processes the captured color image portion of the produce item 18 and the captured color image portion of the one or more target color swatches 40 in accordance with executable instructions of image data correction program 70 to provide a corrected color image of the produce item 18, as will be described in more detail hereinbelow.

Referring to FIG. 4, flow diagram 100 depicts operation of a method in accordance with one embodiment to correct for variations in measured color of the produce item 18 due to variations in natural light or variations in interior light.

In step 102, a determination is made as to whether a produce item has been placed on scale 16. If determination in step 102 is negative (i.e., no produce item has been placed on scale 16), the process proceeds to step 104. In step 104, a background image including the one or more target color swatches 40 is captured before returning back to step 102. However, if determination step 102 is affirmative (i.e., a produce item has been placed on scale 16), then the process proceeds to step 106.

In step 106, a color image of produce item 18 and the one or more target color swatches 40 is captured. Then, in step 108, a determination is made as to whether image data correction program 70 is enabled. If determination step 108 is negative (i.e., image data correction program 70 is not enabled), then the process terminates. When the process terminates, the captured color image of the produce item 18 and the one or more target color swatches 40 is not corrected for variations in illumination and is passed on to transaction terminal 20 and transaction server 24 to identify produce item 18 and to calculate a price for the identified produce item as previously described hereinabove. However, if determination in step 108 is affirmative (i.e., the image data correction program 70 is enabled), then the process proceeds to step 110.

In step 110, color data from the captured image portion of the one or more target our swatches 40 is compared with color data from the store 72 of reference color swatches 72 (FIG. 3). Then, in step 112, one or more color correction factors are calculated based upon the color data comparisons in step 110. The comparisons of color data in step 110 and the calculations of the one or more color correction factors in step 112 result in generation of a transformation matrix.

More specifically, a back propagation algorithm is applied to the compared color data and the calculated correction factors to generate the transformation matrix. There are a number of suitable back propagation algorithms which can be applied to generate the transformation matrix. The back propagation algorithm is a known general method to minimize the objective function which, in this case, is the distance between the store 72 of reference color swatches and the captured target color swatches 40. A transformation matrix is generated by computing the difference between the store 72 of reference color swatches and the captured target color swatches 40 along with the object image (which is the produce item 18 in this case). For each captured color image of a produce item, a new transformation matrix is computed. Suitable back propagation algorithms for generating transformation matrices are known and, therefore, will not be described.

In step 114, the back propagation algorithm then applies the one or more color correction factors (which were calculated in step 112) to correct for colors in the captured color image portion of the produce item 18. Accordingly, the back propagation algorithm is used both during generation of transformation matrices and during color correction of produce item images. The corrected color image of the produce item is a normalized color image which has been corrected for variations in illumination color due to a combination of variations in natural lighting and variations in interior lighting. As shown in step 116, the normalized color image of produce item 18 is provided for further processing to identify produce item 18. More specifically, control circuitry 60 sends the normalized color image of produce item 18 to transaction terminal 20 for further processing using known produce recognition software 21 (FIG. 1) as previously described hereinabove.

It should be apparent that the above description describes a method to correct for color variations in the measured color of produce item 18 due to variations in natural light and interior light illuminating the produce item 18. Recognition and verification of produce item 18 are improved when measured color of produce item 18 is corrected for illumination color variations due to a combination of variations in natural light and variations in interior light.

It should also be apparent that the above description describes a controlled color detection method to correct for lighting variations across the field of view (i.e., the aperture 94) of produce color data collector 14. The control color detection method is automatic in that the method is performed without human intervention.

Although the above description describes color image data correction method being performed each time a produce item is placed in the field of view (i.e., the aperture 94) of produce color data collector 14, it is conceivable that the calculation of the one or more color correction factors may be performed in advance of a produce item being presented in the field of view of produce color data collector 14. The advance calculation of the one or more color correction factors may be based upon captured background images as shown in step 104 in FIG. 4. The captured background images include captured color images of the one or more target color swatches 40 since the target color swatches 40 are in the field of view of the aperture 94 of produce color data collector 14.

Although the above description describes only produce color being used to identify a produce item, it is conceivable that produce color may be used in conjunction with a combination of other produce characteristics such as produce shape, produce area density, and produce texture to aid in identification of the produce item.

Also, although the above description describes a method and apparatus for correcting color variations in measured color of produce items, it is conceivable that the method and apparatus may be applied to correct color variations in measured color of non-produce items.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A produce recognition system comprising:
    an image capture device arranged to (i) capture a first color image which is representative of a color image of a produce item, and (ii) capture a second color image which is representative of a color image of at least one target color swatch; and
    control circuitry arranged to (i) calculate one or more color correction factors based upon differences between the captured second color image and a store of reference color images, and (ii) apply the calculated one or more color correction factors to the captured first color image to correct for color variations in the color image of the produce item due to a combination of variations in natural lighting and variations in interior lighting.

2. A produce recognition system according to claim 1, wherein the control circuitry arranged to calculate one or more color correction factors includes the control circuitry arranged to generate a transformation matrix based upon a comparison of colors between the captured second color image and the store of reference color images.

3. A produce recognition system according to claim 2, wherein the control circuitry arranged to calculate one or more color correction factors includes the control circuitry arranged to apply a back propagation algorithm during generation of the transformation matrix.

4. A produce recognition system according to claim 3, wherein the control circuitry arranged to apply the calculated one or more color correction factors includes the control circuitry arranged to apply a back propagation algorithm during application of the calculated one or more color correction factors to the captured first color image to correct for color variations in the color image of the produce item due to the combination of variations in natural lighting and variations in interior lighting.

5. A produce recognition system according to claim 1, further comprising a weighing scale having a weighing plate in which the at least one target color swatch is embedded.

6. A produce recognition system according to claim 5, wherein the image capture device has an aperture with a field of view in which the at least one target color swatch lies.

7. A produce recognition system according to claim 5, wherein the at least one target color swatch comprises four target color swatches embedded in the weighing plate of the weighing scale.

8. A produce recognition system according to claim 7, wherein the image capture device has an aperture with a field of view in which each of the four target color swatches lies.

9. An apparatus for correcting variations in measured produce color in a produce recognition system, the apparatus comprising:
    at least one target color swatch;
    a store of reference color swatches;
    an image capture device arranged to (i) capture first color data which is representative of a color image of a produce item, and (ii) capture second color data which is representative of a color image of the at least one target color swatch illuminated by a combination of natural light and interior light; and
    control circuitry arranged to (i) compare the captured second color data with a store of reference color data which is representative of the store of reference color swatches, (ii) calculate one or more color correction factors based upon the comparison of the captured second color data with the store of reference color data, and (iii) process the first color data based upon the calculated one or more color correction factors to provide corrected first color data which is representative of a corrected color image of the produce item.

10. An apparatus according to claim 9, wherein the at least one target color swatch comprises an array of 24 scientifically prepared natural, chromatic, primary, and grayscale color squares in a range of different colors.

11. An apparatus according to claim 9, wherein the store of reference color swatches comprises a store of color image data which is representative of at least one reference color swatch against which color image data which is representative of the at least one target color swatch is compared.

12. An apparatus according to claim 9, wherein the image capture device comprises a charge coupled device (CCD).

13. A method of correcting variations in measured produce color in a produce recognition system, the method comprising:
    capturing first color data which is representative of a color image of a produce item;
    capturing second color data which is representative of a color image of one or more target color swatches illuminated by a combination of natural light and interior light;
    comparing the captured second color data with a store of reference color data;
    calculating one or more color correction factors based upon the comparison of the captured second color data with the store of reference color data; and
    processing the first color data based upon the calculated one or more color correction factors to provide corrected first color data which is representative of a corrected color image of the produce item.

14. A method according to claim 13, wherein the first and second color data are captured at the same time.

15. A method according to claim 13, wherein capturing second color data includes capturing color data which is representative of a color checker.

16. A method according to claim 15, wherein comparing the second color data with a store of reference color data includes comparing the captured color data which is representative of a color checker with the store of reference color data.

17. A method according to claim 16, wherein calculating one or more color correction factors includes generating a transformation matrix based upon the comparison of the captured color data which is representative of a color checker with the store of reference color data.

18. A method according to claim 17, wherein processing the first color data includes applying a back propagation algorithm to the generated transformation matrix to provide the corrected first color data which is representative of the corrected color image of the produce item.

* * * * *